United States Patent
Nakajima et al.

[11] Patent Number: 6,134,067
[45] Date of Patent: Oct. 17, 2000

[54] CASSETTE DEVICE FOR USING CASSETTES WITH AND WITHOUT A SECOND RECORDING MEDIUM IN THE CASSETTE

[75] Inventors: Toshihiko Nakajima; Hiroo Edakubo, both of Kanagawa-ken, Japan

[73] Assignee: Canon Kabushiki Kaisha, Tokyo, Japan

[21] Appl. No.: 08/719,309

[22] Filed: Sep. 24, 1996

Related U.S. Application Data

[63] Continuation of application No. 08/278,751, Jul. 22, 1994, abandoned.

[30] Foreign Application Priority Data

Jul. 30, 1993 [JP] Japan ................................. 5-190093
Jul. 30, 1993 [JP] Japan ................................. 5-190102

[51] Int. Cl.$^7$ .......................... G11B 15/07; G11B 23/34
[52] U.S. Cl. ........................................ 360/69; 360/132
[58] Field of Search ........................ 360/69, 71, 72.2, 360/132, 133

[56] References Cited

U.S. PATENT DOCUMENTS

| | | | |
|---|---|---|---|
| 4,172,231 | 10/1979 | D'Alayer De Costemore D'Arc et al. ........... 318/7 |
| 4,338,644 | 7/1982 | Staar ........................................ 360/132 |
| 4,554,599 | 11/1985 | Shiozaki ..................................... 360/69 |
| 4,796,100 | 1/1989 | Sakaguchi ................................... 358/342 |
| 4,860,128 | 8/1989 | Nakagawa ................................... 360/60 |
| 4,903,159 | 2/1990 | Kawano ..................................... 360/132 |
| 5,132,947 | 7/1992 | Kameda et al. ............................. 369/32 |
| 5,159,182 | 10/1992 | Eisle ........................................ 235/492 |
| 5,218,487 | 6/1993 | Richmond .................................. 360/27 |

FOREIGN PATENT DOCUMENTS

| | | |
|---|---|---|
| 265167 | 4/1988 | European Pat. Off. . |
| 266101 | 5/1988 | European Pat. Off. . |
| 4-76861 | 3/1992 | Japan .................................... 360/71 |
| 02355 | 2/1991 | WIPO . |

*Primary Examiner*—Aristotelis M Psitos
*Assistant Examiner*—James L Habermehl
*Attorney, Agent, or Firm*—Robin, Blecker & Daley

[57] ABSTRACT

An electronic apparatus adapted for use of a cassette having a first recording medium and a second recording medium which differs from the first recording medium includes a detecting circuit arranged to detect whether the cassette is provided with the second recording medium and an ejecting circuit arranged to eject the cassette if the cassette is found by the detecting circuit to be not provided with the second recording medium.

57 Claims, 8 Drawing Sheets

CASSETTE DEVICE FOR USING CASSETTES WITH AND WITHOUT A SECOND RECORDING MEDIUM IN THE CASSETTE

This is a continuation application under 37 CFR 1.62 of prior application Ser. No. 08/278,751, filed Jul. 22, 1994 and now abandoned.

BACKGROUND OF THE INVENTION

1. Field of the Invention

This invention relates to a cassette device adapted for the use of either a cassette having a memory other than a tape or a cassette having no memory.

2. Description of the Related Art

The troublesomeness of arranging and keeping cassettes in proper order increases accordingly as the number of cassettes in a household stock increases. As a result, an inconvenience is that the contents of records kept in old cassettes become hardly distinguishable.

To solve this problem, it has been considered to provide a memory on a cassette, to store such data as the date of recording, the contents of the record, titles, comments, a table of contents, etc., and, when reproducing the record, to read the data stored in the memory, so that the data of each record can be readily found and a search can be easily made.

However, if the contents of the record are not important or in the event of a matter for which it is not necessary to store data in the memory, the provision of the memory incurs an unnecessary cost increase.

The unnecessary cost increase can be avoided by having cassettes which are provided with such memories or cassettes which are provided with no memory in a commingled state. Actual use of the cassettes of the two different kinds, however, necessitates making a discrimination between the two kinds and conducting communication only with the memory of the cassette provided with the memory.

SUMMARY OF THE INVENTION

It is an object of this invention to provide a cassette device which is capable of adequately controlling cassettes of both of the two kinds, one having a memory and the other having no memory.

To attain this object, an electronic apparatus adapted for use of a cassette having a first recording medium and a second recording medium which differs from the first recording medium is arranged according to this invention to include detecting means for detecting whether a cassette mounted on the apparatus is provided with the second recording medium, and means for ejecting the cassette when the cassette is found by the detecting means to be not provided with the second recording medium.

The above and other objects and features of this invention will become apparent from the following detailed description of embodiments thereof taken in connection with the accompanying drawings.

DETAILED DESCRIPTION OF THE PREFERRED EMBODIMENTS

Some of the embodiments of this invention are described in detail below with reference to the drawings.

Figure 1:
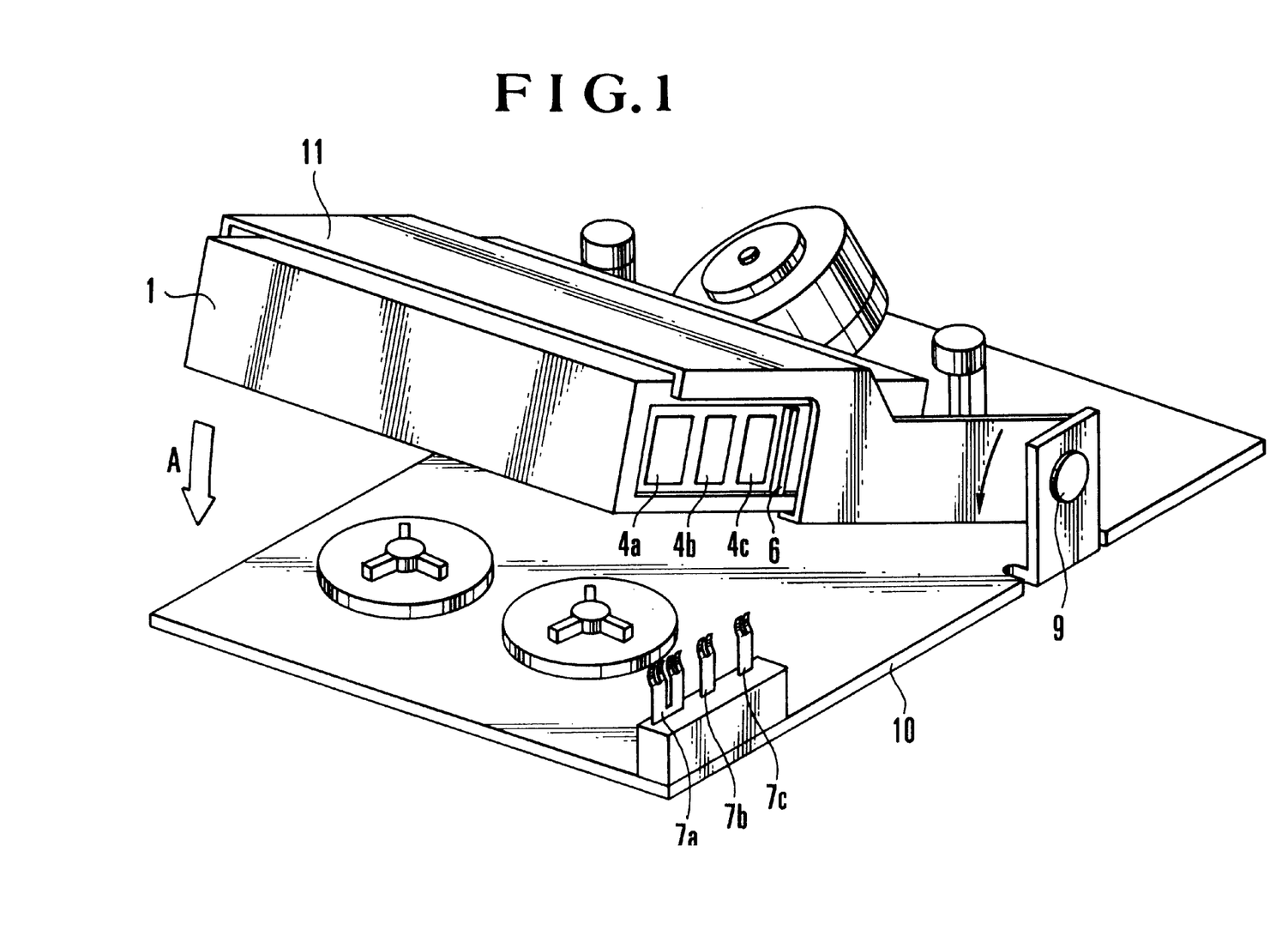
FIG. 1 is an oblique view showing a first embodiment of this invention in a state of mounting and demounting a cassette.
Figure 2:
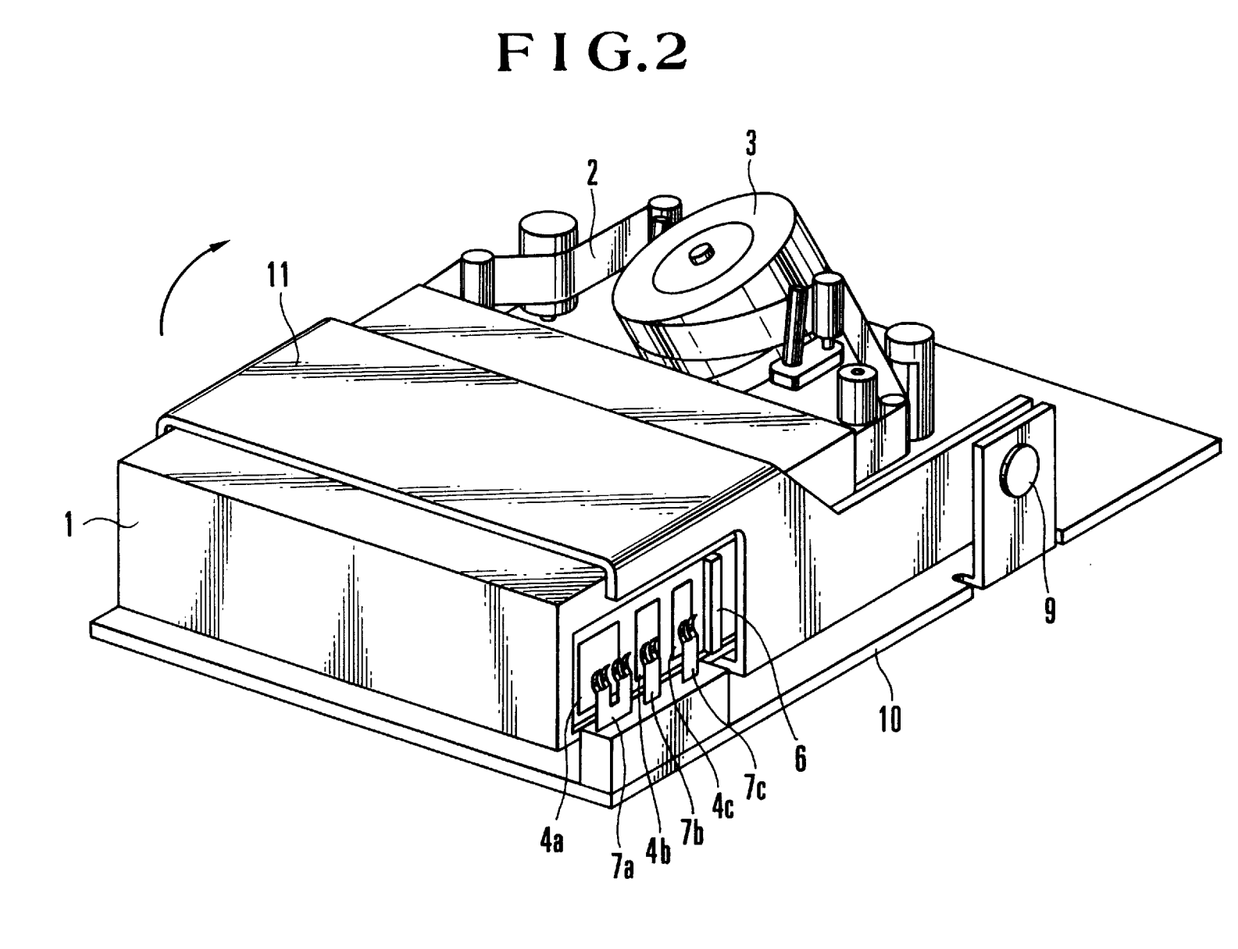
FIG. 2 is an oblique view showing the first embodiment in a state of having the cassette mounted.

The operation of a first embodiment to be performed with a cassette inserted is first described with reference to FIGS. 1 and 2. FIGS. 1 and 2 are oblique views showing a cassette device which is the first embodiment of this invention in its states obtained in ejecting and inserting the cassette.

In FIG. 1, the cassette 1 is shown in a state of having been inserted into a cassette holder 11 which is in a cassette mounting-demounting position. Referring to FIG. 1, when the cassette holder 11 is pushed down, in the direction of arrow A, by the operator or by some moving means which is not shown, the cassette holder 11 turns around a shaft 9 to reach a predetermined position as shown in FIG. 2. A lock mechanism which is not shown locks the cassette holder 11 to a chassis 10. A tape loading action is then carried out in a known manner to bring a tape 2 into contact with a drum 3 by pulling the tape 2 out from the cassette 1.

The cassette 1 is provided with a contact 4a for grounding, a contact 4b for communication and a contact 4c for a power supply. Contacts 7a, 7b and 7c corresponding respectively to the contacts 4a, 4b and 4c are disposed on the side of the chassis 10. With the cassette 1 having been inserted in this manner, the contacts 4a, 4b and 4c move to their positions as shown in FIG. 2 by coming into sliding contact respectively with their corresponding contacts 7a, 7b and 7c. The contact of these engagement enables the main body of the device to communicate with the memory provided on the cassette in a manner as will be described later herein. Any dust or the like that exists on each of the contacts can be removed by the sliding contact action, so that the reliability of the device can be enhanced. Further, since inadequate contact would bring about a serious trouble such as destruction of the memory, the contact 4a for grounding is arranged to be located in a farthest position with respect to the shaft 9 among others in such a way as to have a longer sliding distance than other. In addition to that, the grounding contact 4a is arranged to have a larger contact area than the other contacts 4b and 4c which are provided respectively for communication and for the power supply. The arrangement further enhances reliability.

Figure 3:
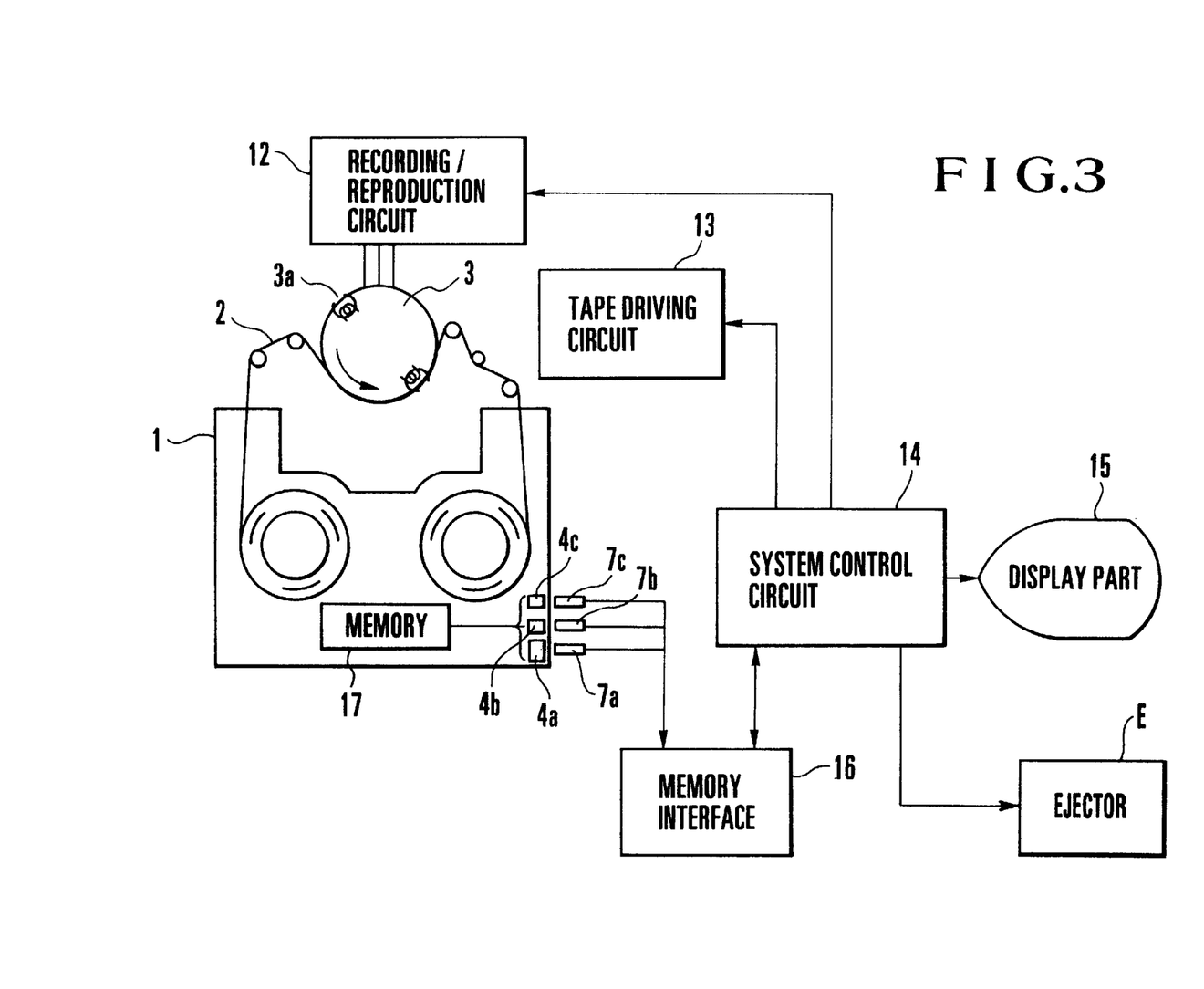
FIG. 3 is a block diagram showing the system arrangement of the first embodiment of this invention.

Communication with the memory to be conducted after insertion of the cassette 1 is next described with reference to FIG. 3. FIG. 3 shows the system arrangement of the cassette device in a state obtained with the cassette 1 inserted.

Referring to FIG. 3, a system control circuit 14 is arranged to control a recording/reproduction circuit 12, a tape driving circuit 13 and a display part 15. A nonvolatile memory (storage) 17 such as an EEPROM (electrically erasable programmable read-only memory) is disposed on the side of the cassette 1. A memory interface 16 is arranged to permit transmission of data between the memory 17 and the system control circuit 14.

With the embodiment arranged in this manner, in recording, the embodiment operates as follows. The system control circuit 14 controls the recording/reproduction circuit 12 and the tape driving circuit 13 to cause an image signal or the like outputted from the recording/reproduction circuit 12 to be recorded on a tape 2 by a magnetic head 3a mounted on the drum 3 while the tape 2 is moved at a predetermined moving speed. In this instance, since the cassette 1 is provided with the memory 17, the data which relates to the recording time and the contents of the record as mentioned in the foregoing and some specific data for detecting the presence of the memory are stored in the memory 17 through the memory interface 16 and the contacts 4b, 4c, 7b and 7c.

At the time of reproduction, the data of the contents in storage of the memory 17, such as the recording time of the cassette, the contents of records on the tape 2, etc., is read out by the system control circuit 14 through the memory interface 16. The data thus read out is used in making a search and at the same time, for a display to be made by the display part 15. An operation to be performed by the embodiment at the time of reproduction is described below with reference to FIG. 4 which is a flow chart.

Figure 4:
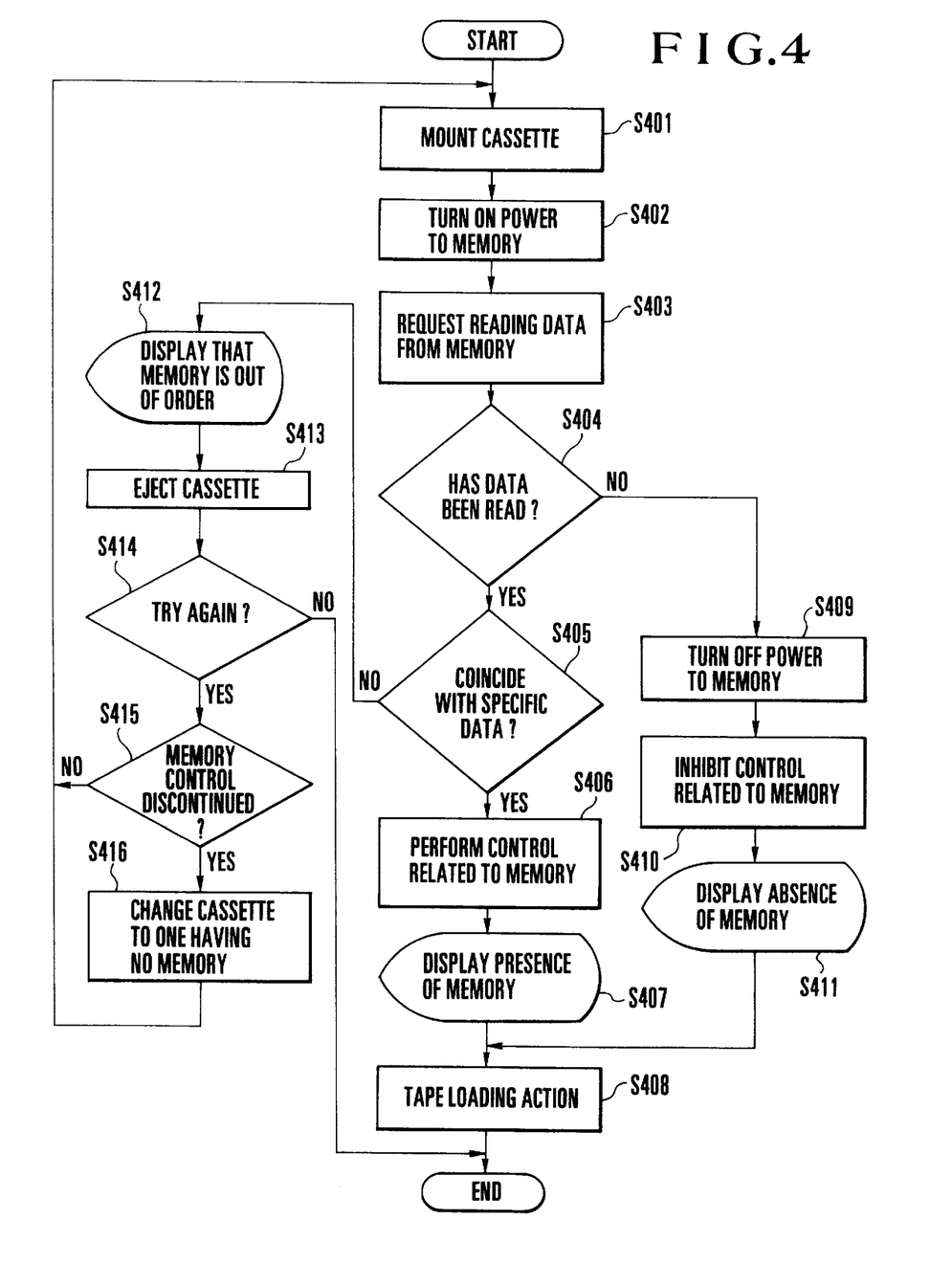
FIG. 4 is a flow chart showing the flow of operation of the first embodiment to be performed when the cassette is inserted in the first embodiment.
Figure 5:
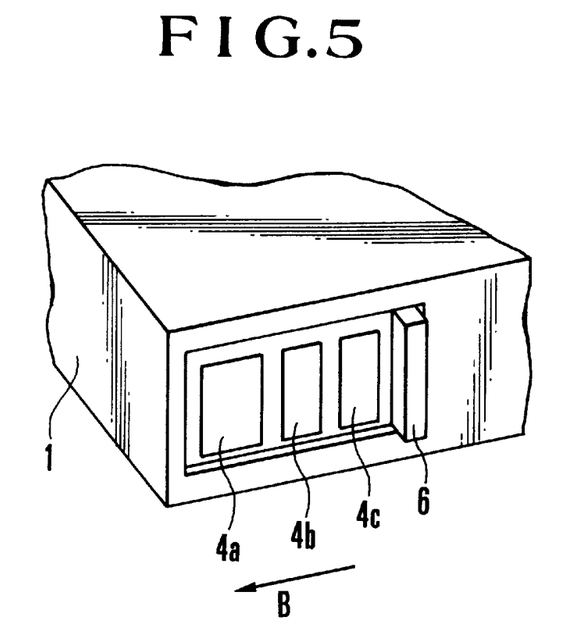
FIG. 5 is an oblique view showing a part of the cassette around contacts which are arranged on the side of the cassette to permit communication with a memory.

Referring to FIG. 4, after the cassette 1 is mounted at a step S401 in the manner as described above, the flow of operation comes to a step S402. At the step S402, the system control circuit 14 causes a power supply to turn on to supply electric power to the memory 17 through the contacts (or terminals) 7c and 4c and renders the memory 17 accessible. After the power is supplied to the memory 17, the flow comes to a step S403. At the step S403, a request is made for reading data from the memory 17 and the flow waits a predetermined period of time for arrival of the data. At a step S404, a check is made to find if the data has been sent within the predetermined period of waiting time. If not, the cassette is decided to have no memory and the flow comes to a step S409. At the step S409, the supply of power to the memory is turned off. At a step S410, control related to the memory is inhibited to prevent the short-circuiting of the terminal part or the malfunction of the device due to static electricity. At a step S411, the display part 15 is caused to make a display indicating that the cassette has no memory. The flow then comes to a step S408 to allow a tape loading action to be carried out.

If the data is found at the step S404 to have been sent from the memory 17 within the predetermined period of time, the flow comes to a step S405. At the step S405, the data thus received is checked to find if it coincides with predetermined specific data. If so, the cassette is decided to be a normal memory cassette and the flow comes to a step S406. At the step S406, the system control circuit 14 performs the control related to the memory such as the display of memory contents or the retrieval based on memory data. At a step S407, the display part 15 is caused to make a display indicating the presence of a memory.

Figure 6:
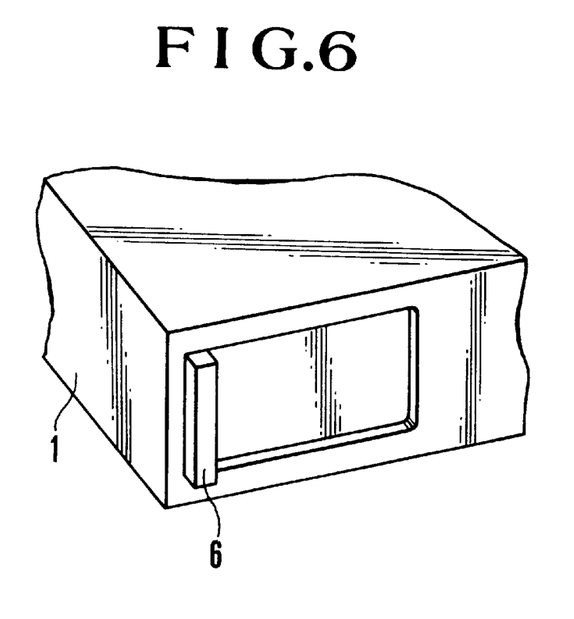
FIG. 6 is an oblique view showing the same part of the cassette in a state of having the contacts hidden by a cover on the side of the cassette.

If the data from the memory 17 is found at the step S405 to differ from the specific data, the cassette is assumed to have its memory or its contact part out of order. The flow then comes to a step S412. At the step S412, the display part 15 is caused to make a display indicating that the memory is out of order. The flow then comes to a step S413 to perform an ejecting action on the cassette 1. In cases where it is decided, through steps S414 and 415, to use the cassette even at the expense of the control related to the memory, the flow comes to a step s416. At the step S416, the contacts 4a, 4b and 4c of the cassette 1 are hidden by a cover 6 as shown in FIG. 6 to turn the cassette 1 into a state of having no memory. After that, the cassette 1 by ejector E (FIG. 3) is again mounted on the device. Further, if the defectiveness of the memory is considered at the step S415 to have resulted from inadequate contact caused by dust or the like at the contact part, the cassette may be again mounted as it is, because it is possible that the dust might be removed by the sliding contact of the contact part when the cassette 1 is thus mounted once again.

In the case of the first embodiment, only one kind of specific data is used for discriminating or identifying the data of the memory. The memory data, however, can be more finely controlled by setting such discrimination (identification) data for each of data relative to the capacity of the memory, the kind of the tape, the recording time, etc.

As described above, the first embodiment is arranged to communicate with the memory when reproducing a record from the tape and to make a discrimination between a cassette with a memory and a cassette without any memory through the presence or absence of data obtainable from the memory. The arrangement of the first embodiment permits use of cassettes of both kinds, one having a memory and the other having no memory.

Further, with data sent from the memory, even when the memory is considered to be rejected, through a check made for the presence or absence of the specific discrimination data, if the rejection is made for imperfect contact, the arrangement of the embodiment permits the operator to entertain an expectation of removal of the imperfect contact by again inserting the cassette after the cassette is ejected.

While the embodiment is arranged for application to a VTR which uses a magnetic tape, the same advantages are attainable with the device arranged for a cassette containing a recording medium other than a magnetic tape.

Figure 7:
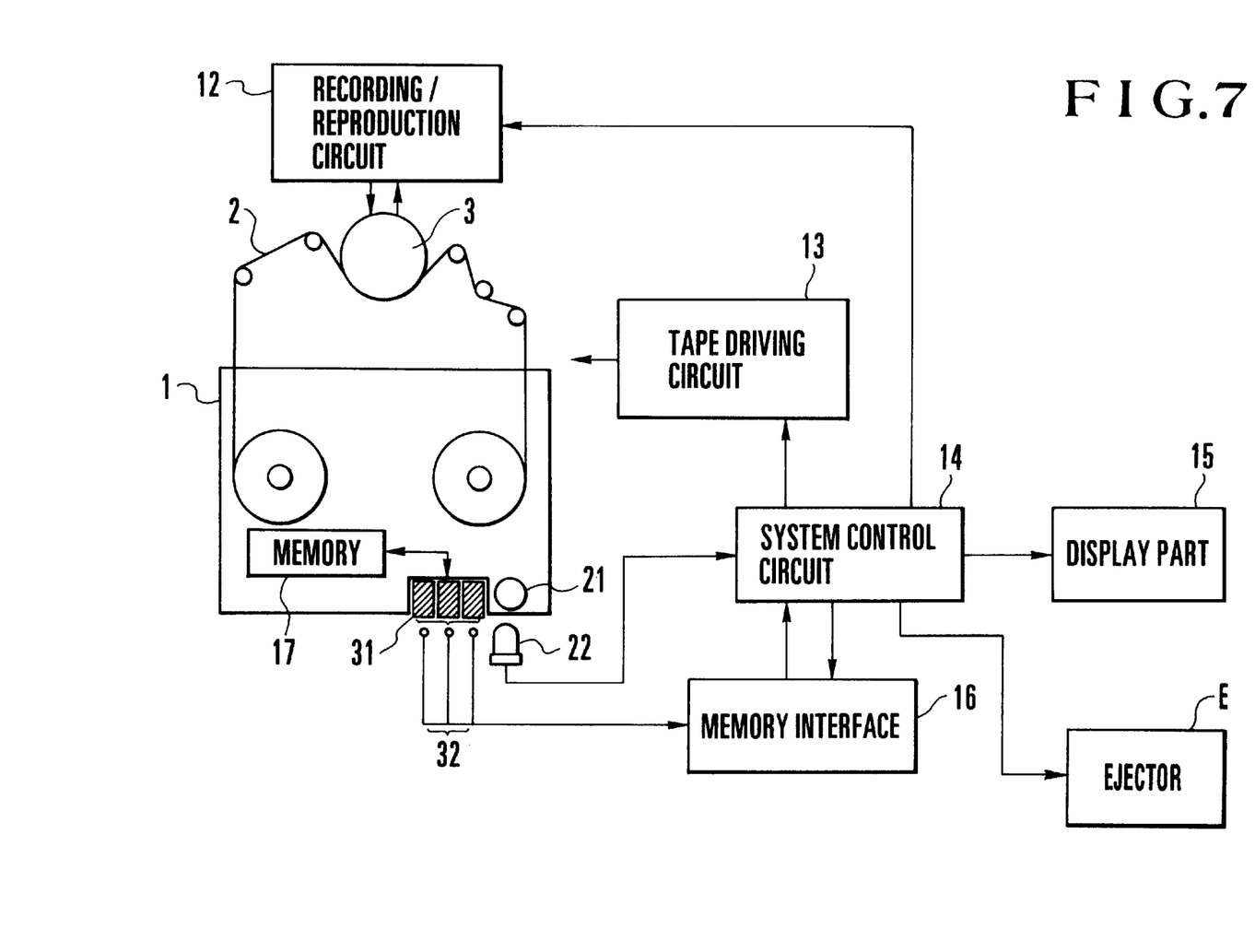
FIG. 7 is a block diagram showing the system arrangement of a second embodiment of this invention.

A second embodiment of this invention is next described in detail with reference to the drawings. FIG. 7 shows the system arrangement of the cassette device which is the second embodiment. In FIG. 7, a cassette 1 is shown in a state of having been inserted into a cassette holder. The second embodiment is arranged to perform its recording and reproducing actions in the same manner as those of the first embodiment. In FIG. 7, the same parts as those of FIG. 3 are indicated by the same reference numerals and the details of them are omitted from the following description.

In the case of the second embodiment, the cassette is checked for the presence or absence of a memory through a detection pin 22 which is provided on the side of the device and which is arranged to engage a hole part 21 provided on the side of the cassette. As shown in FIG. 7, contacts 31 which are provided on the side of the cassette are arranged at a bottom part of the cassette to abut on contacts 32 which are provided on the side of the device.

The memory detecting action of the device is described below with reference to FIGS. 8(a) and 8(b).

Figure 8A:
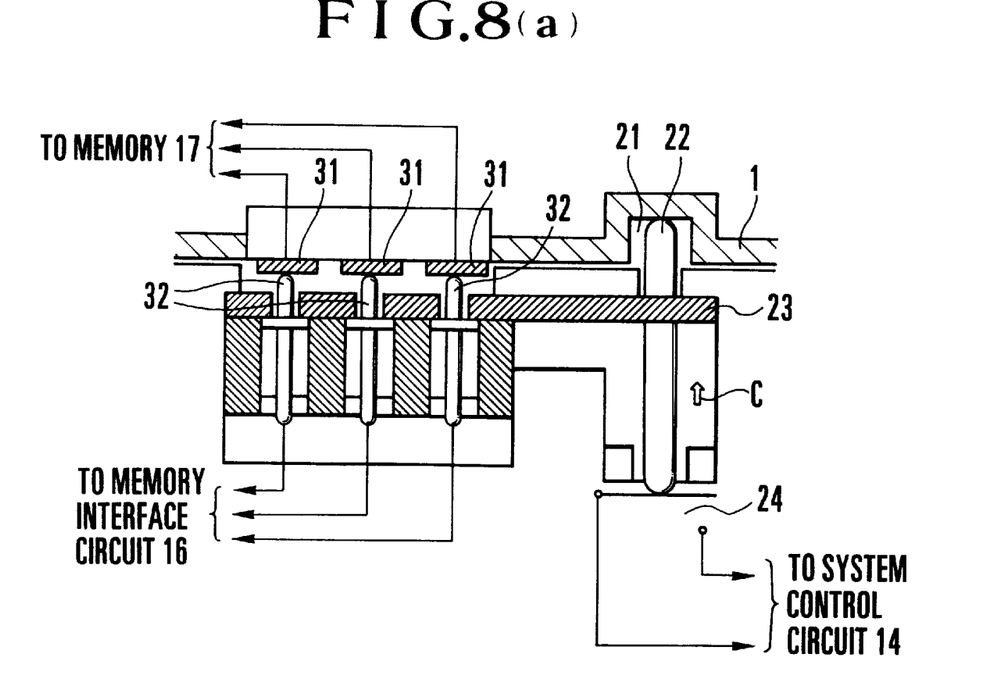
FIGS. 8(a) and 8(b) are sectional views of the second embodiment showing the arrangement of a memory detecting hole part and a terminal part provided for communication with the memory of a cassette.
Figure 8B:
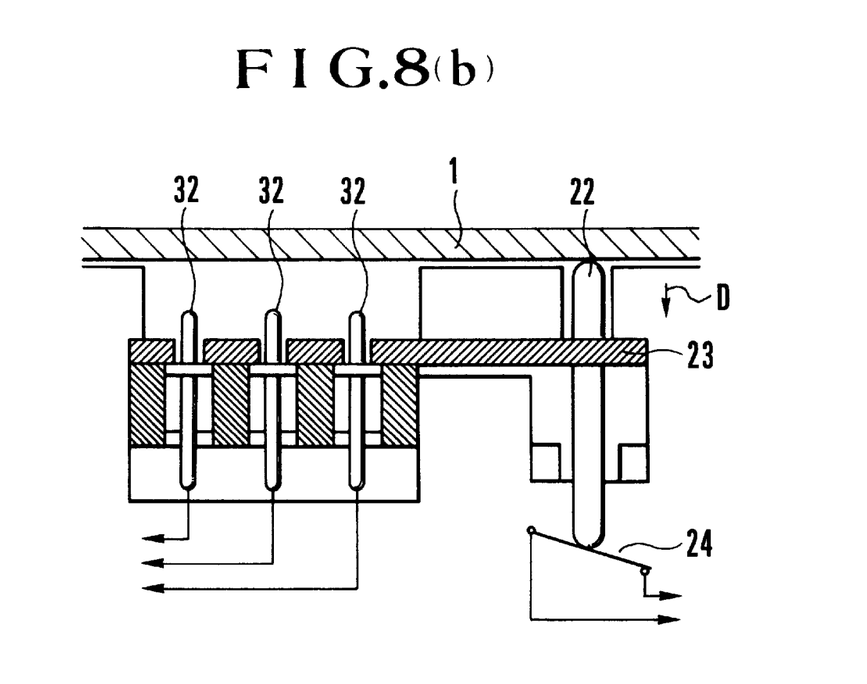

FIGS. 8(a) and 8(b) show the memory detecting part and parts located in the neighborhood of terminals provided for communication with the memory. FIG. 8(a) shows the device in a state obtained when the cassette has a memory. FIG. 8(b) shows the device in a state obtained when the cassette has no memory.

Referring to FIG. 8(a), a contact moving member 23 is secured to the pin 22 which is provided for memory detection. The contact moving member 23 is arranged to move the contacts 32 as the pin 22 moves upward or downward. A switch 24 which is provided for detecting the presence or absence of a memory through the movement of the pin 22 is arranged to turn off if the cassette has a memory and to turn on if the cassette has no memory. The contacts 32 and the pin 22 are being urged to move in the direction or arrow C by some urging means such as springs or the like which are not shown.

With the second embodiment arranged in this manner, if the cassette 1 is provided with a memory, the pin 22 and the contacts 32 do not move, even when the cassette 1 is mounted, because of the hole part 21 which is provided in the cassette 1 for memory detection. The contacts 31 which are disposed on the side of the cassette then come into contact with the contacts 32 to bring a memory 17 into a state of being electrically connected to the body of the device.

In a case where a cassette 1 which is not provided with any memory and has no memory detecting hole formed therein is mounted on the cassette device, the pin 22 is pushed in the direction of arrow D down to a position as shown in FIG. 8(b). The downward movement of the pin 22 causes the switch 24 to turn on. The system control circuit 14 then judges or decides the cassette to have no memory and does not perform any control related to a memory. According to the downward movement of the pin 22, the contacts 32 move to positions where they never come into contact with the cassette 1. Therefore, these contacts 32 can be protected from static electricity caused by the electric charge of the cassette or from any soiled part of the body of the cassette. The circuit arrangement thus can be prevented from being broken by static electricity, and the reliability of the contacts 32 can be thus enhanced.

Figure 9:
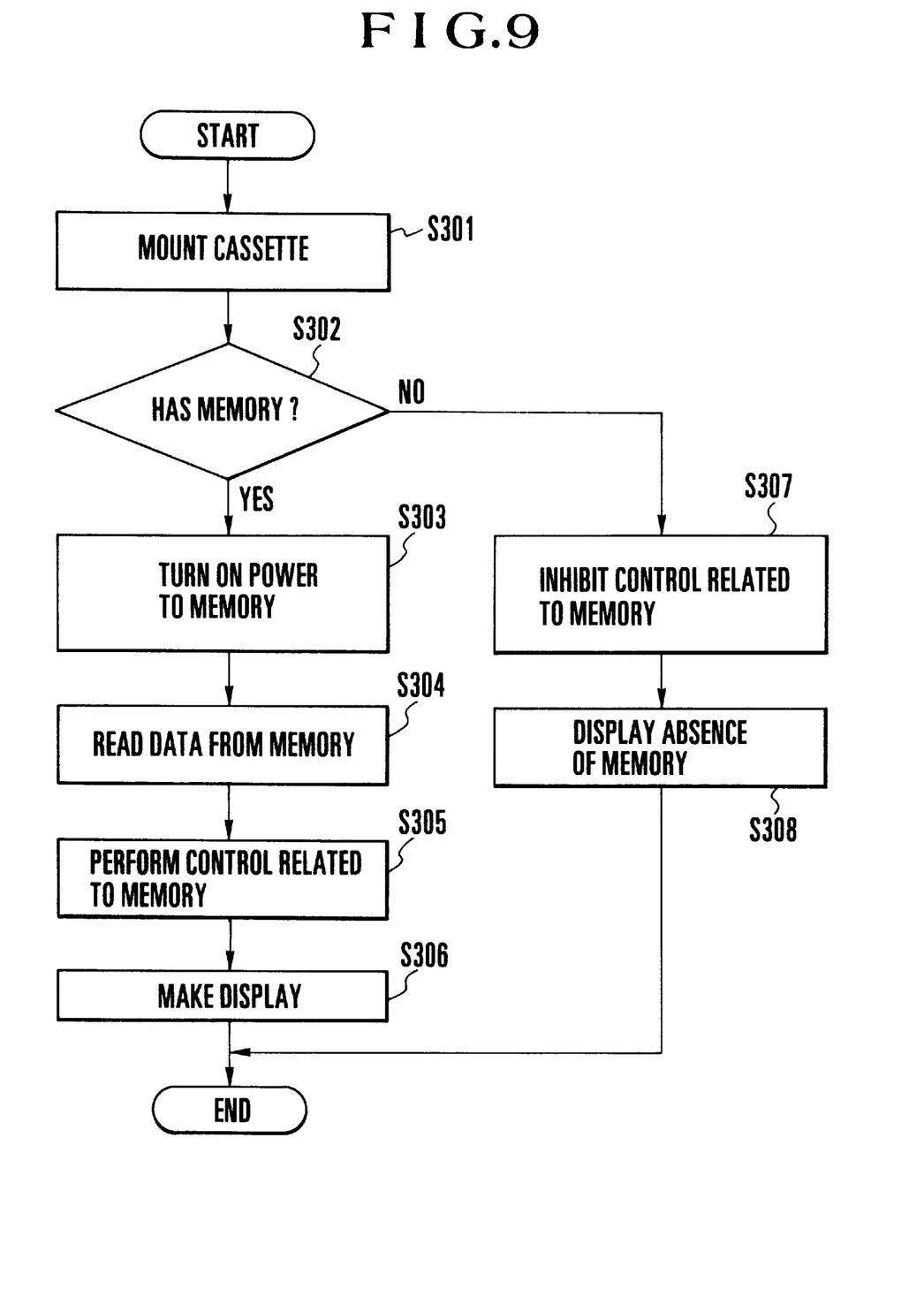
FIG. 9 is a flow chart showing the operation of the second embodiment of this invention.

The operation of the second embodiment to be performed after the above-stated detection is described below with reference to FIG. 9 which is a flow chart.

After the cassette 1 is mounted at a step S301, the flow comes to a step S302 to find if the cassette 1 has a memory. If so, the flow of operation comes to a step S303 to turn on the supply of power to the memory 17. At a step S304, data stored in the memory 17 is read out. At a step S305, control related to the memory 17 is executed. After the control, the flow comes to a step S306 to cause the display part 15 to make a display relative to the data of the memory. After the display, the flow comes to an end.

If the cassette 1 is found to have no memory at the step S302, the flow comes to a step S307. At the step S307, the control related to the memory is inhibited. At a step S308, a display is made indicating that the cassette has no memory, and the flow is terminated.

The second embodiment is thus arranged to judge the presence or absence (existence or nonexistence) of a memory by using a pin. Therefore, the cassettes of both kinds having the memory or not having the memory can be appositely handled. In using the cassette having no memory, the contacts arranged on the side of the body of the device never come into contact with the contacts arranged on the side of the body of the cassette. The circuit of the device, therefore, can be prevented from being broken and the reliability of the terminals can be enhanced.

The second embodiment is arranged to perform control for all the cassettes of the kind having the memory. However, the embodiment may be arranged to have the memory detecting hole part arranged to be closable and openable as desired and to inhibit the control related to the memory by closing the hole part when it is not desired to perform the control related to the memory.

What is claimed is:

1. An electronic apparatus adapted for use of a cassette having a first recording medium and a second recording medium which differs from said first recording medium, comprising:

communication means for communicating with said second recording medium;

detecting means for detecting whether the cassette is provided with the second recording medium on the basis of a communication state of said communication;

ejecting means for ejecting the cassette; and control means for controlling said ejecting means to eject the cassette in the case that said detecting means detects the cassette does not have the second recording medium.

2. An apparatus according to claim 1, wherein said detecting means is arranged to detect whether predetermined information is communicated with said second recording medium by said communication means.

3. An apparatus according to claim 1, further comprising indicating means for indicating the detected result of said detecting means.

4. An apparatus according to claim 1, wherein said communication means comprises a terminal which is electrically connected to said second recording medium.

5. An apparatus according to claim 1, further comprising:

first recording means for recording information on said first recording medium; and second recording means for recording information on said second recording medium.

6. An apparatus according to claim 5, wherein said second recording means is arranged to record information related to the information recorded by said first recording means.

7. An apparatus according to claim 1, wherein said first recording medium is a movable recording medium and wherein said second recording medium is an immobile recording medium.

8. An apparatus according to claim 7, wherein said movable recording medium is a magnetic tape and wherein said immobile recording medium is a memory.

9. An apparatus according to claim 8, wherein said memory is an EEPROM.

10. An electronic apparatus adapted for use of a cassette having a first recording medium and a second recording medium which differs from said first recording medium, comprising:

communication means for communicating with said second recording medium; and control means for restricting a predetermined operation of the apparatus, wherein said predetermined operation is carried out on the basis of information recorded on the second recording medium, in a case that after said cassette is mounted, said communication means is instructed to read out predetermined data from said second recording medium and said predetermined data is not read out within a predetermined time thereafter.

11. An apparatus according to claim 10, wherein said communication means comprises a terminal which is electrically connected to said second recording medium.

12. An apparatus according to claim 10, further comprising:

first recording means for recording information on said first recording medium; and second recording means for recording information on said second recording medium.

13. An apparatus according to claim 12, wherein said second recording means is arranged to record on said second recording medium information related to the information recorded by said first recording means.

14. An apparatus according to claim 13, wherein said second recording means is arranged to record on second recording medium information for reference of said first recording medium.

15. An apparatus according to claim 14, wherein said second recording means is arranged to record on said second recording medium information related to recording time of said first recording medium.

16. An apparatus according to claim 14, wherein said second recording means is arranged to record on said second recording medium information related to recording contents of said first recording medium.

17. An apparatus according to claim 14, wherein said second recording means is arranged to record on said second recording means a kind of said first recording medium.

18. An apparatus according to claim 10, wherein said first recording medium is a movable recording medium and wherein said second recording medium is an immobile recording medium.

19. An apparatus according to claim 18, wherein said movable recording medium is a magnetic tape and wherein said immobile recording medium is a memory.

20. An apparatus according to claim 19, wherein said memory is an EEPROM.

21. An apparatus according to claim 10, wherein said control means is arranged to detect whether the cassette is provided with said second recording medium according to whether or not the predetermined data is read out.

22. An apparatus according to claim 10, further comprising indicating means for indicating a detected result of said detecting means.

23. An apparatus according to claim 10, further comprising supply means for supplying electric power to said second recording medium, wherein said control means restricts supply of said electric power to said second recording medium by said supply means.

24. An electronic apparatus adapted for use of a cassette having a first recording medium and a second recording medium which differs from said first recording medium, comprising:
    communication means for communicating with said second recording medium; and
    control means for restricting the communication by said communication means, in a case that after said cassette is mounted, said communication means is instructed to read out predetermined data from said second recording medium and said predetermined data is not read out within a predetermined time thereafter.

25. An apparatus according to claim 24, further comprising indicating means for indicating the detected result of said detecting means.

26. An apparatus according to claim 24, wherein said communication means comprises a terminal which is electrically connected to said second recording medium.

27. An apparatus according to claim 24, wherein said control means is arranged to detect whether the cassette is provided with said second recording medium according to whether or not the predetermined data is read out.

28. An apparatus according to claim 24, wherein said first recording medium is a movable recording medium and wherein said second recording medium is an immobile recording medium.

29. An apparatus according to claim 24, wherein said movable recording medium is a magnetic tape and said immobile recording medium is a memory.

30. An apparatus according to claim 29, wherein said memory is an EEPROM.

31. An apparatus according to claim 24, further comprising:
    first recording means for recording information on said first recording medium; and
    second recording means for recording information on said second recording medium.

32. An apparatus according to claim 31, wherein said second recording means is arranged to record information related to the information recorded by said first recording means.

33. An apparatus according to claim 32, wherein said second recording means is arranged to record on said second recording medium information for reference of said first recording medium.

34. An apparatus according to claim 32, wherein said second recording means is arranged to record on said second recording medium information related to recording time of said first recording medium.

35. An apparatus according to claim 32, wherein said second recording means is arranged to record on said second recording medium information related to recording contents of said first recording medium.

36. An apparatus according to claim 32, wherein said second recording means is arranged to record on said second recording medium a kind of said first recording medium.

37. An apparatus according to claim 24, further comprising supply means for supplying electric power to said second recording medium, wherein said control means restricts supply of said electric power to said second recording medium by said supply means.

38. An electronic apparatus adapted for use of a cassette having a first recording medium and a second recording medium which differs from said first recording medium, comprising:
    recording means for recording information on said first and/or second recording medium;
    communication means for communicating with said second recording medium; and
    control means for restricting information to be recorded on said first and/or second recording medium by said recording means in a case that after said cassette is mounted, said communication means is instructed to read out predetermined data from said second recording medium and said predetermined data is not read out within a predetermined time thereafter.

39. An apparatus according to claim 38, further comprising indicating means for indicating the detected result of said detecting means.

40. An apparatus according to claim 38, wherein said communication means comprises a terminal which is electrically connected to said second recording medium.

41. An apparatus according to claim 38, wherein said detecting means is arranged to detect whether the cassette is provided with said second recording medium in accordance with the communication state of said communication means.

42. An apparatus according to claim 38, wherein said first recording medium is a movable recording medium and wherein said second recording medium is an immobile recording medium.

43. An apparatus according to claim 42, wherein said movable recording medium is a magnetic tape and said immobile recording medium is a memory.

44. An apparatus according to claim 43, wherein said memory is an EEPROM.

45. An electronic apparatus adapted for use of a cassette having a first recording medium and a second recording medium which differs from said first recording medium, comprising:

communication means for communicating with said second recording medium; and control means for restricting a control related to said second recording medium in a case that after said cassette is mounted, said communication means is instructed to read out predetermined data from said second recording medium and said predetermined data is not read out within a predetermined time thereafter.

46. An apparatus according to claim 45, further comprising:

first recording means for recording information on said first recording medium; and second recording means for recording information on said second recording medium.

47. An apparatus according to claim 46, wherein said second recording means is arranged to record information related to the information recorded by said first recording means.

48. An apparatus according to claim 47, wherein said second recording means is arranged to record on said second recording medium information for reference of said first recording medium.

49. An apparatus according to claim 48, wherein said second recording means is arranged to record information related to recording time of said first recording medium.

50. An apparatus according to claim 48, wherein said second recording means is arranged to record on said second recording medium information related to recording contents of said first recording medium.

51. An apparatus according to claim 48, wherein said second recording means is arranged to record on said second recording medium a kind of said first recording medium.

52. An apparatus according to claim 45, wherein said first recording medium is a movable recording medium and wherein said second recording medium is an immobile memory.

53. An apparatus according to claim 52, wherein said movable recording medium is a magnetic tape and wherein said immobile memory is an EEPROM.

54. An apparatus according to claim 45, further comprising indicating means for indicating a detected result of said detecting means.

55. An apparatus according to claim 45, wherein said communication means comprises a terminal which is electrically connected to said second recording medium.

56. An apparatus according to claim 45, wherein said control means is arranged to detect whether the cassette is provided with said second recording medium according to whether or not the predetermined data is read out.

57. An apparatus according to claim 45, further comprising supply means for supplying electric power to said second recording medium, wherein said control means restricts supply of said electric power to said second recording medium by said supply means.

* * * * *

UNITED STATES PATENT AND TRADEMARK OFFICE
CERTIFICATE OF CORRECTION

PATENT NO.   : 6,134,067
DATED        : October 17, 2000
INVENTOR(S)  : Toshihiko Nakajima et al.

Page 1 of 1

It is certified that error appears in the above-identified patent and that said Letters Patent is hereby corrected as shown below:

Column 2,
Line 49, delete "The contact of these engagement" and insert -- The engagement of these contacts --.

Column 4,
Line 3, delete "cassette 1." and insert -- cassette 1 by ejector E (FIG. 3). --.
Line 9, delete "cassette 1 by ejector E (FIG. 3) is again" and insert -- cassette 1 is again --.

Signed and Sealed this

Eighteenth Day of December, 2001

Attest:

Attesting Officer

JAMES E. ROGAN
Director of the United States Patent and Trademark Office